United States Patent [19]
Isoda et al.

[11] Patent Number: 4,911,110
[45] Date of Patent: Mar. 27, 1990

[54] WASTE HEAT RECOVERY SYSTEM FOR LIQUID-COOLED INTERNAL COMBUSTION ENGINE

[75] Inventors: Mitsumasa Isoda; Tamotsu Nishitsuji; Yoshimichi Takamatsu; Katsunori Takamiya, all of Sakai, Japan

[73] Assignee: Kubota Ltd., Osaka, Japan

[21] Appl. No.: 216,162

[22] Filed: Jul. 7, 1988

[30] Foreign Application Priority Data

Jul. 10, 1987 [JP] Japan ................................ 62-173498

[51] Int. Cl.$^4$ ............................................. F01P 11/02
[52] U.S. Cl. ............................ 123/41.14; 123/41.29; 123/142.5 R
[58] Field of Search ............... 123/41.29, 41.31, 41.14, 123/142.5 R; 237/12.1, 13; 290/2

[56] References Cited

U.S. PATENT DOCUMENTS

| | | | |
|---|---|---|---|
| 2,051,240 | 8/1936 | Berryman | 237/13 |
| 4,065,055 | 12/1977 | De Cosimo | 290/2 |
| 4,226,214 | 10/1980 | Palazzetti | 123/2 |
| 4,686,378 | 8/1987 | Sisk | 290/2 |

FOREIGN PATENT DOCUMENTS 58-143151 8/1983 Japan .

OTHER PUBLICATIONS

Abstract of Japanese Patent Application 58-143151(A), titled "Method for Utilizing Waste Heat of Stationary Internal-Combustion Engine", Aug. 1983.

Primary Examiner—Noah P. Kamen
Attorney, Agent, or Firm—Lowe, Price, LeBlanc, Becker & Shur

[57] ABSTRACT

In a waste heat recovery system for a liquid-cooled internal combustion engine, including a water jacket of a liquid-cooled internal combustion engine in which a portion of the heat generating in the engine is absorbed by an engine cooling liquid, a first heat exchanger is provided for heat absorption from the exhaust gas in which the exhaust gas heat is absorbed thereby and a second heat exchanger is provided for heat recovery in which the waste heat is recovered from the engine cooling liquid carrying the above-mentioned heat. A second circuit for waste heat recovery from the engine includes the first heat exchanger and the second heat exchanger, both being connected to the water jacket in series. The second circuit is adapted to return the engine cooling liquid within the water jacket to the water jacket through the first heat exchanger and the second heat exchanger by a forced circulation force or a natural circulation force. Futhermore, the first circuit for engine cooling comprises an engine cooling radiator which is connected to the water jacket in the manner of a circulation loop. The first circuit is adapted to circulate the engine cooling liquid at least through the water jacket and the engine cooling radiator. The engine cooling radiator is constructed so that the heat radiation therefrom can be controlled by a heat radiation control mechanism.

5 Claims, 6 Drawing Sheets

WASTE HEAT RECOVERY SYSTEM FOR LIQUID-COOLED INTERNAL COMBUSTION ENGINE

BACKGROUND OF THE INVENTION

1. Field of the Invention

The present invention relates to a waste heat recovery system for a liquid-cooled internal combustion engine, in which engine heat that is absorbed by engine cooling liquid in a water jacket and exhaust gas heat that is absorbed by the engine cooling liquid in a first heat exchanger for heat absorption from exhaust gas (a gas/liquid heat exchanger) is recovered from the engine cooling liquid by heat transfer from a second heat exchanger for heat recovery (a liquid/liquid heat exchanger).

A conventional waste heat recovery system for a liquid-cooled internal combustion engine, for such a purpose is one disclosed in U.S. Pat. No. 4,226,214.

The conventional system is provided with a circuit for a waste heat recovery from an engine, and is composed of a first heat exchanger for heat absorption from exhaust gas and a second heat exchanger for heat recovery, both heat exchanges being connected in series to a water jacket within an engine body, and in which the engine cooling liquid in the water jacket is adapted to be returned to the water jacket through the first heat exchanger and then the second heat exchanger. Therefore, the engine cooling liquid which absorbs the heat in the water jacket also absorbs the exhaust gas heat during flow through the first heat exchanger to reach a high temperature and then radiates the heat contained therein to an external thermal load such a hot-water reservoir or the like through the second heat exchanger.

There are, however, the following disadvantages associated with the above-mentioned prior art.

In the case that the output of an internal combustion engine is taken out as electric power or the like during continuous operation, when the heat transfer is stopped by the stoppage of the operation of the external thermal load or when the heat quantity radiated in the second heat exchanger gets less than that absorbed in the first heat exchanger due to a reduction of the heat quantity consumed in the external thermal load, the temperature of the engine cooling liquid gets increase excessively because the heat quantity transferred from the engine cooling liquid in the second heat exchanger decreases. Resultantly, the continuous operation of the internal combustion engine is hindered by its overheat and disadvantageously it becomes impossible to continue the takeout of its output power.

SUMMARY OF THE INVENTION

The present invention is directed to solving the problems noted above, and has for its object to enable the continuous operation of an internal combustion engine even when the operation of an external thermal load is stopped and even when a energy demand to the external thermal load gets less.

For accomplishing the above-mentioned object, the present invention is characterized in that the waste heat recovery system noted above is improved as follows.

A first circuit for engine cooling is constructed by the communication of an engine cooling radiator to a water jacket so as to enable a circulation. The first circuit for the engine cooling is arranged so that the engine cooling liquid can absorb the heat of the engine body in the water jacket and then radiate the heat in the engine cooling radiator by the circulation thereof at least through the water jacket and the engine cooling radiator. And the engine cooling radiator is constructed so that its heat radiation can be controlled by a heat radiation control means.

The present invention functions as follows.

When the waste heat recovery system is fully operated according to a large external thermal load, the engine cooling radiator is changed over, i.e., controlled, the heat radiation control means so as to perform a partial radiation or to stop radiation. In this condition, since great quantities of engine cooling liquid flows through both these heat exchangers, i.e., the water jacket and the first heat exchanger for the heat absorption from the exhaust gas, great quantities of heat are exchanged in both heat exchangers. Accordingly, since the hot engine cooling liquid flows abundantly through the second heat exchanger, the waste heat recovery efficiency in the waste heat recovery system is enhanced.

On the other hand, when the heat radiation in the second heat exchanger is stopped by a stoppage of the operation of the external thermal load, or when the heat quantity radiated in the second heat exchanger becomes less than that absorbed in the first heat exchanger for the heat absorption from the exhaust gas due to the reduction of the heat quantity consumed in the external thermal load, the heat radiation control means is controlled as follows. By a manual or an automatic operation of the heat radiation control means, the heat radiation condition in the engine cooling radiator is changed over from the above-mentioned condition to a full radiation condition. Thereupon, the engine cooling liquid is cooled sufficiently by the engine cooling radiator even in the case that the heat radiation is stopped or decreased in the second heat exchanger for the heat recovery. As a result, the internal combustion engine is prevented from being overheated so as to continue its operation.

Therefore, the present invention has the following advantages.

(1) Even in the case that it becomes impossible to cool the engine cooling liquid sufficiently due to a change of the operational condition in the external thermal load, an overheat condition can be prevented because the engine cooling liquid is cooled sufficiently by the engine cooling radiator. Accordingly, the internal combustion engine can continue operation so as to deliver its output power continuously.

In the case that a portion of the waste heat recovery system is changed as follows, the following additional advantages can be obtained.

Figure 1:
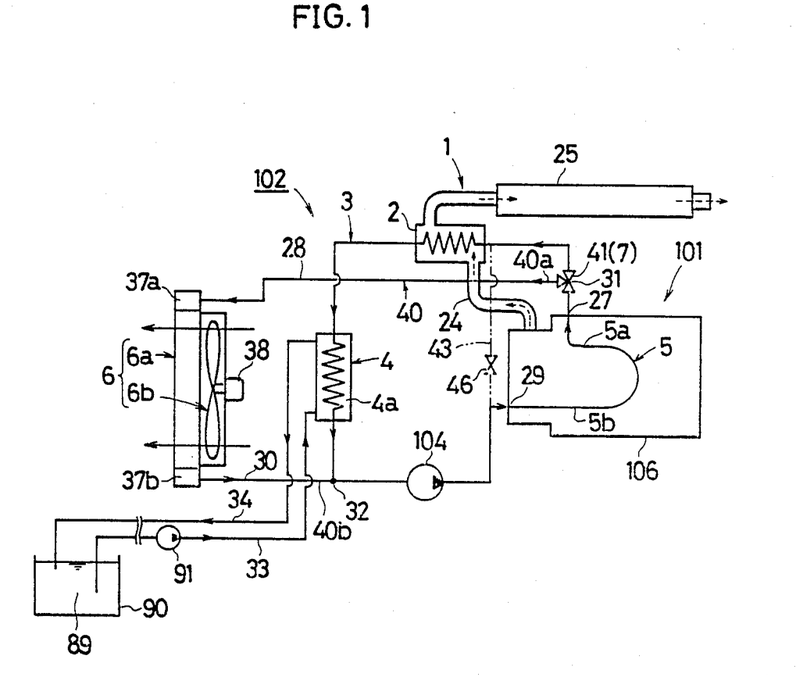
FIG. 1 is a schematic view of a waste heat recovery system thereof.

(2) In the case that, for example as shown in FIG. 1 of the embodiment of the present invention, the first circuit for the engine cooling is connected to the second circuit for waste heat recovery from the engine in parallel therewith, the inlet portion of the first circuit for the engine cooling is connected to an intermediate portion between the water jacket and the first heat exchanger for heat absorption from the exhaust gas and the outlet portion thereof is connected to the intermediate portion between the second heat exchanger for the heat recovery and the water jacket, the heat radiation control means is provided with a circuit changeover valve.

When the circuit changeover valve is constructed so that the engine cooling liquid can be circulated after the changeover thereof to one of the second heat exchanger for the heat recovery and the engine cooling radiator, the following advantage can be attained.

When a full radiation condition is required owing to the stoppage of the operation of the external thermal load, the engine cooling liquid can be supplied abundantly to the engine cooling radiator of the first circuit for the engine cooling circuit. Hence, the engine cooling radiator can ensure transfer of great quantities of radiation heat per unit area and can be constructed compactly.

Figure 6:
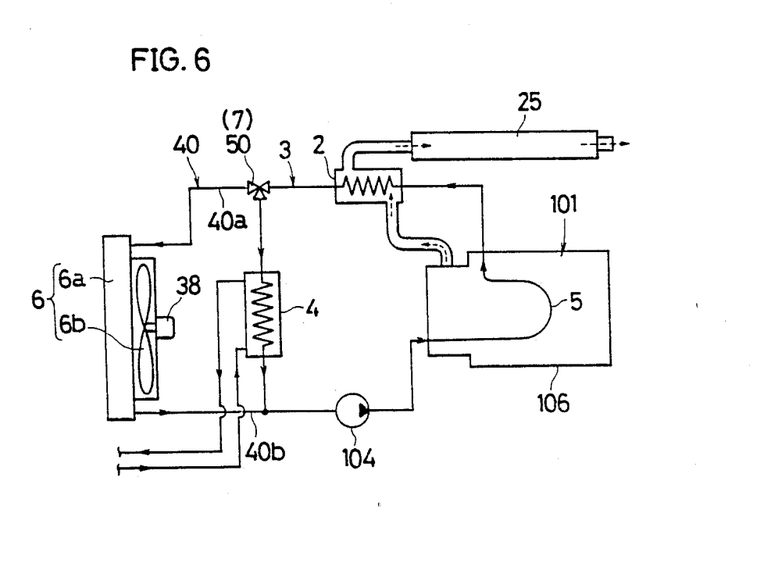

(3) In the case that the construction of the above item (2) is changed, for example as shown in FIG. 6 of another embodiment of the present invention, so that the inlet portion of the first circuit for the engine cooling is connected to an intermediate portion between the first heat exchanger for heat absorption from the exhaust gas and the second heat exchanger for the heat recovery and the outlet portion thereof are connected to the intermediate portion between the second heat exchanger and the water jacket, the following advantages can be obtained.

When the circuit changeover valve is changed over to the position wherein the operation for heat radiation is carried out, the exhaust gas is maintained at a comparatively low temperature because the exhaust gas flowing through the first heat exchanger is cooled by the engine cooling liquid which has radiated its heat sufficiently in the engine cooling radiator. Therefore, in the internal combustion engine, an increase of a back pressure thereof can be prevented so as to keep a charging efficiency at a large value, and an output power as well as a fuel consumption thereof can be improved by the improved charging efficiency. Further, since the temperature of the exhaust gas can be decreased and the flow volume of the exhaust gas can be lessened, the internal combustion engine can be operated quietly without any increase of exhaust sound.

(4) In the case that, in the construction of the above-mentioned item (2) or (3) (refer to FIG. 1 or FIG. 6), the circuit changeover valve of the heat radiation control means is repalced with a variable flow dividing valve which serves to divide the flow of the engine cooling liquid into two portions to the second heat exchanger for the heat recovery and to the engine cooling radiator so as to be circulated and of which dividing proportion can be varied adjustably, the following advantage can be obtained.

Since the flow of the engine cooling liquid can be divided between the second heat exchanger for the heat recovery and to the engine cooling radiator according to the operational condition of the external thermal load, the variation of the temperature of the engine cooling liquid can be restrained so that the internal combustion engine can be operated within a suitable temperature range even in the case of a large variation of the external thermal load.

Figure 5:
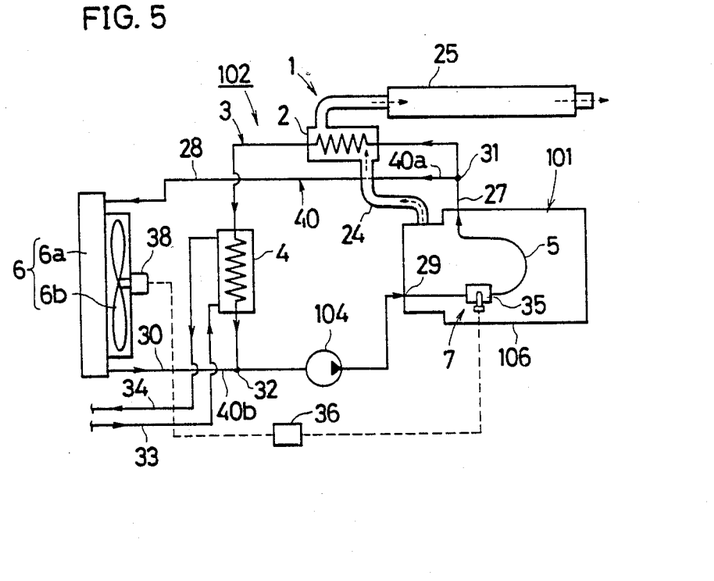
FIGS. 5 through 9 are views showing variant embodiments respectively corresponding to FIG. 1.

(5) In the case that the construction of the above-mentioned item (2) or (3) is changed, for example as shown in FIG. 5 of further another embodiment of the present invention, so that the heat radiation control means comprises a radiator fan, a start and stop control device for the fan and a temperature sensor, the radiator fan is started by the start and stop control device for the fan based on the detection of a temperature rise of the engine body by the temperature sensor and it is stopped temporarily by the start and stop control device for the fan based on the detection of a normal temperature of the engine body by the temperature sensor, the following advantages can be obtained.

Since the heat radiation control means can control the changeover between the radiation and the stoppage thereof merely by the start and stop of the radiator fan, it is readily automated and its structure is simplified in its application.

Figure 8:
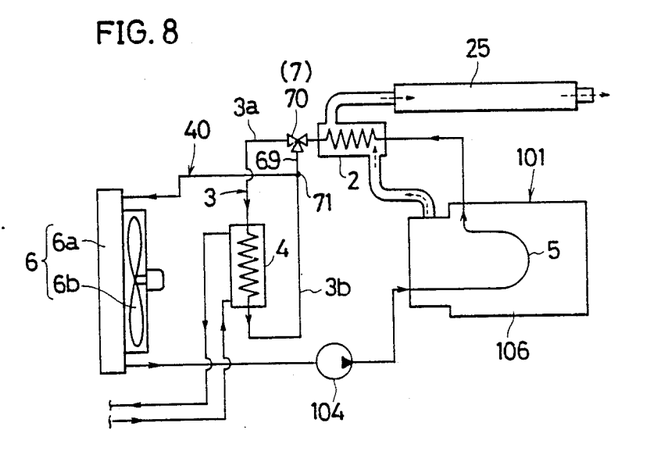

(6) In the case that, for example as shown in FIG. 8 of further another embodiment of the present invention, the inlet portion and the outlet portion of the second heat exchanger for the heat recovery are connected shortly by a bypass line and the engine cooling liquid is circulated after the changeover to one of the second heat exchanger for the heat recovery and the bypass line by means of a bypass valve, the following advantage can be obtained.

Since the engine cooling liquid can be cooled only by the engine cooling radiator under the bypass condition of the second heat exchanger for the heat recovery even in the case of a partial load operation of the external thermal load, the temperature of the engine cooling liquid can be prevented from being affected by the external thermal load and the operational temperature of the internal combustion engine can be stabilized.

(7) In the case that the engine cooling liquid within the second circuit for the waste heat recovery from the engine is forcibily circulated by the water pump, since the water pump serves also as a pump which forcibly circulates the engine cooling liquid within the first circuit for the engine cooling, the number of pump needed can be reduced and the construction of the waste heat recovery system can be simplified.

(8) In the case that a heat radiation means for engine cooling is composed of the radiator and a radiator fan, and they are located beyond the space provided for accommodating the second heat exchanger for the heat recovery at the lateral side of the internal combustion engine, since both the first heat exchanger for heat recovery from the exhaust gas and the second heat exchanger for heat recovery as well as the piping components for connecting both heat exchangers are arranged compactly between the internal combustion engine and the radiator means for the engine cooling, the internal combustion as a whole engine can be constructed compactly.

(9) Since the whole of the internal combustion engine can be constructed compactly, the length of each pipe line for the second circuit for the waste heat recovery from the engine and the first circuit for the engine cooling can be shortened and the costs of piping materials and of the assembly thereof can be reduced.

Further, since the second circuit for the waste heat recovery from the engine is short, the heat quantity radiated from the pipe line thereof can be reduced, and the waste heat recovery efficiency can be enhanced.

Even further since the second circuit for the waste heat recovery from the engine is short, the flow resistance to the engine cooling liquid can be decreased, and the capacity of the water pump can be reduced.

The foregoing and other objects and attendant advantages of the present invention will be readily appreciated as the same become better understood by reference to the following detailed description when considered with the accompanying drawing, wherein:

BRIEF DESCRIPTION OF THE DRAWING

FIGS. 1 through 9 show different embodiments of the present invention, and

FIGS. 1 through 4 show a preferred embodiment thereof,

DESCRIPTION OF THE PREFERRED EMBODIMENT

The embodiments of the present invention will now be explained with reference to the drawings.

FIGS. 1 through 4 show one embodiment, in which a waste heat recovery system is combined with an internal combustion engine for an engine generator.

First, a general arrangement of the engine generator 100 will be explained with reference to FIG. 2 as follows.

Figure 2:
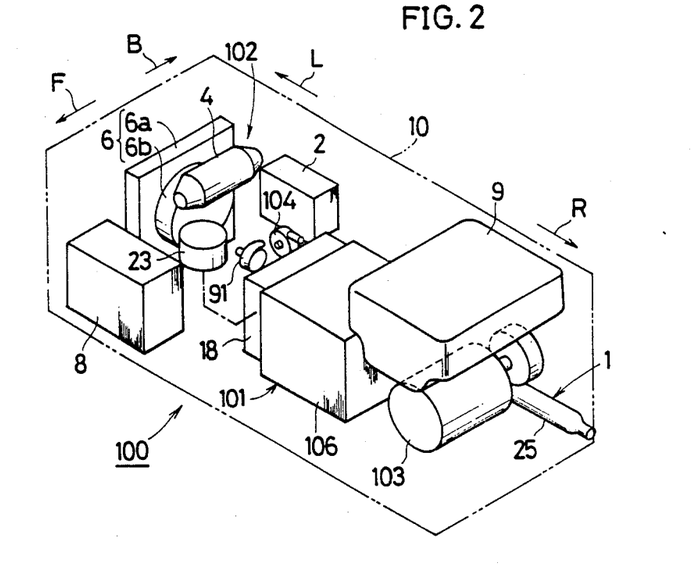
FIG. 2 is a schematic perspective view showing an engine generator equipped with the waste heat recovery system, per FIG. 1.

In FIG. 2, arrow F designates the front side, arrow B the back side, arrow L the left side, and arrow R the right side, respectively of the embodiment of FIG. 1. Based on the directions designated by those arrows, the surroundings of the engine generator 100 will be explained hereinafter.

In the interior space within a soundproof casing 10 having a rectangular configuration, there are arranged an internal combustion engine 101 at the left side and a generator 103 at the right side in parallel each other. In the space at the left side of the internal combustion engine 101, there is arranged a heat radiation means 6 for engine cooling. The heat radiation means 6 for engine cooling comprises an engine cooling radiator 6a and an electrically driven type radiator fan 6b, and a battery 8 is provided in the space at the front side of the heat radiation means 6. In the space above the battery 8, there are arranged an air cleaner 23, a second heat exchanger 4 for heat recovery and a first heat exchanger 2 for heat absorption from exhaust gas in order from the front side of the engine assembly to the side thereof. In the space above the generator 103, a fuel tank 9 is provided.

The engine generator 100 will now be explained in detail with reference to FIG. 1, FIG. 3 and FIG. 4.

Figure 3:
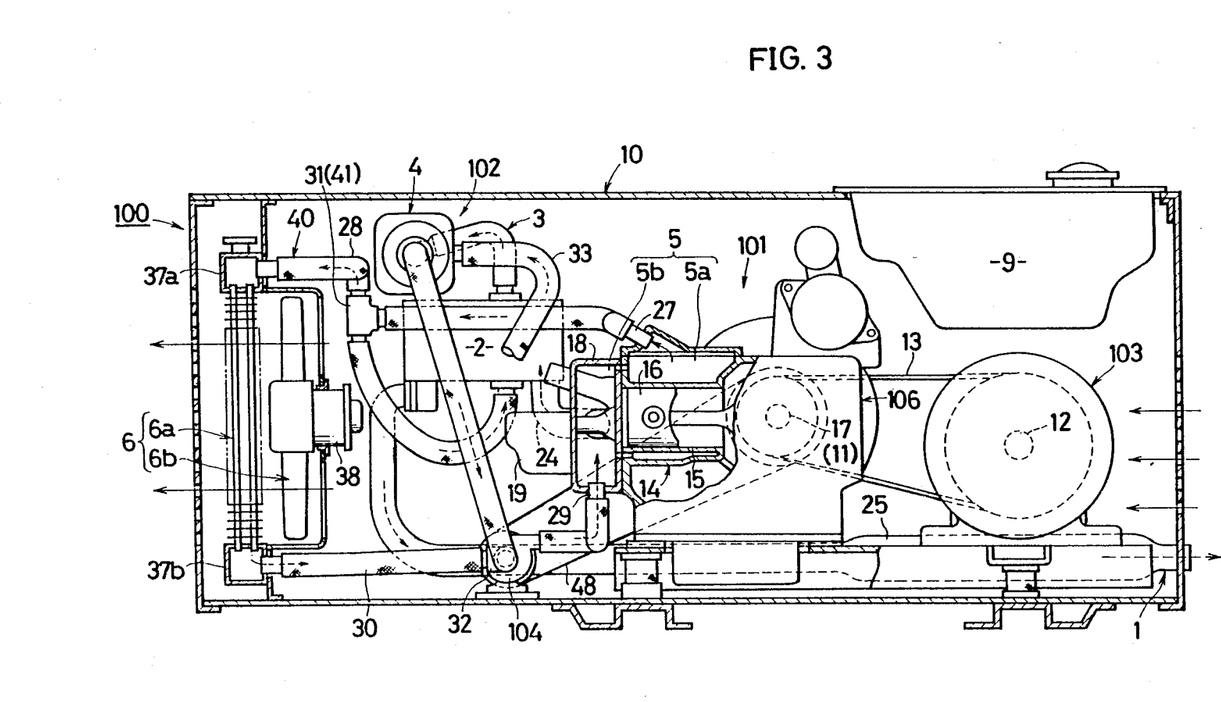
FIG. 3 is a vertical sectional front view showing an engine-generator.
Figure 4:
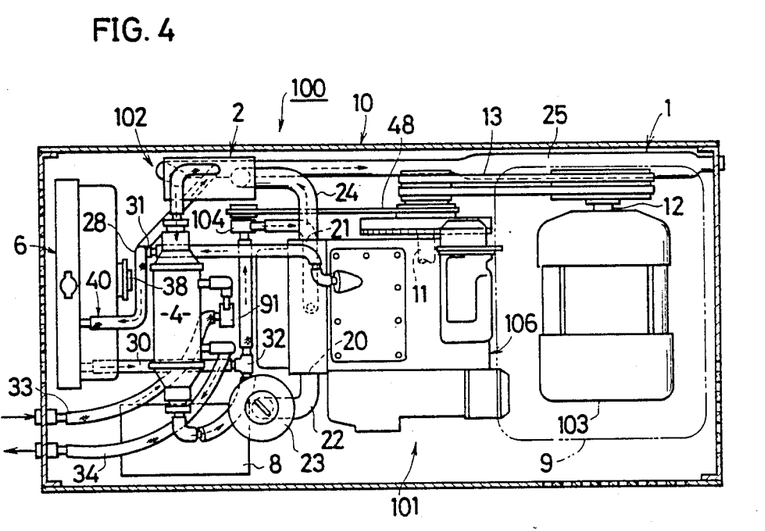
FIG. 4 is a horizontal sectional plan view showing said engine-generator.

In FIGS. 3 and 4, an output shaft 11 is projected backward from an engine body 106 of the internal combustion engine 101 and an input shaft 12 is projected backward from the generator 103. The output shaft 11 is connected interlockingly to the input shaft 12 by a belt type transmission means 13.

The internal combustion engine 101 comprises a water-cooled horizontal Diesel engine of single cylinder type, in which a piston 16 is horizontally slidably fitted into a single cylinder 15 formed in a cylinder body 14 and is connected interlockingly to a crankshaft 17. The output shaft 11 is formed at the rear end portion of the crankshaft 17. A cylinder head 18 and a head cover 19 are fixedly secured at the left side of the cylinder body 14 in order from the right side to the left side. A cylinder jacket 5a is formed in the cylinder body 14 and a head jacket 5b is formed in the cylinder head 18. Cylinder jacket 5a and head jacket 5b form a water jacket 5.

The cylinder head 18 has an intake port 20 opened at the front side thereof and an exhaust port 21 opened at the back side thereof. The air cleaner 23 is connected to the intake port 20 through an intake pipe 22.

An exhaust apparatus 1 of the internal combustion engine 101 comprises the first heat exchanger 2 and a muffler 25 which are connected to the exhaust port 21 through an exhaust pipe 24. The muffler 25 is arranged in the space below the belt type transmission means 13 so as to extend in the left and right direction and its extended outer end projects outward from the back and lower portion of the right side wall of the soundproof casing 10. Since the muffler 25 is located at a position remote from the fuel tank 9, the fuel tank 9 is effectively prevented from being heated intensively by the muffler 25 so that a vapour-lock in a fuel supply system can be prevented.

As a whole, a waste heat recovery system 102 comprises a first circuit 40 for engine cooling and a second circuit 3 for waste heat recovery from the engine both of which are provided in the internal combustion engine 101 constructed as mentioned above. The waste heat recovery system 102 has the second heat exchanger 4 and the heat radiation means 6 for the engine cooling (the assembly of the radiator 6a and the radiator fan 6b) connected in parallel relative to the water jacket 5 of the internal combustion engine 101 and is constructed so as to enable the second circuit 3 for the waste heat recovery from the engine and the first circuit 40 for the engine cooling to be selectively changed over.

Circuits 3 and 40 will now be explained mainly with reference to FIG. 1.

The second circuit 3 for the waste heat recovery from the engine is constructed as follows. The second circuit 3 has one end connected to an outlet nozzle 27 of the water jacket 5, is provided with the first heat exchanger 2, the second heat exchanger 4 and a water pump 104 arranged in order, and has the other end connected to an inlet nozzle 29 of the water jacket 5. The water pump 104 is connected interlockingly to the crankshaft 17 through the belt type transmission means 48 (refer to FIGS. 3 and 4).

The first circuit 40 for the engine cooling is constructed as follows. An inlet portion 40a of the first circuit 40 is branched out from a branching point 31 of the second circuit 3 and connected to an upper tank 37a of the radiator 6a through a hot water pipe 28. The outlet portion 40b is branched out from a branching point 32 of the second circuit 3 and is connected to a lower tank 37b of the radiator 6a through a cool water pipe 30. As a heat radiation control means for the radiator 6a, there is provided a circuit changeover valve 41 at the branching point 31.

The first heat exchanger 2 for the heat recovery from the exhaust gas comprises a gas/liquid type heat exchanger and serves to recover the residual heat of the exhaust gas which flows through the interiors of small tubes thereof by the engine cooling water (the engine cooling liquid) which flows outside the small tubes. The second heat exchanger 4 comprises a liquid/liquid type heat exchanger and serves to recover the heat of the engine cooling water which flows through the interiors of small tubes thereof by fresh water 89 for heat recovery which flows outside the small tubes. A heat absorbing portion 4a of the second heat exchanger 4 for the waste heat recovery is connected through the cool water pipe 33 and the hot water pipe 34 to a hot water reservoir 90 which is provided outside the engine generator 100. An electrically driven type circulation pump 91 is interposed in the cool water pipe 33. The circulation pump 91 comprises an electrically driven pump which is supplied with electric power from the generator 103 as a driving source, and is arranged in the space below the second heat exchanger 4 within the soundproof casing 10 (refer to FIG. 4).

The flow of the engine cooling water in the waste heat recovery system 102 will now be explained with reference to FIG. 1.

In the case that the waste heat from the internal combustion engine 101 is required to be fully recovered owing to a large hot water feeding load in the hot water reservoir 90, the circuit changeover valve 41 is changed over to the waste heat recovery position so as to allow the water flow from the water jacket 5 to the second circuit 3 as well as to block the water flow to the first circuit 40. Accordingly, the engine cooling water from the water jacket 5 is adapted to be returned to the water jacket 5 through the circuit changeover valve 41, the first heat exchanger 2, the second heat exchanger 4, the branching point 32 and the water pump 104 so that the heat of the engine body 106 and the exhaust gas heat can be recovered in the second heat exchanger 4.

To the contrary, in the case that the hot water feeding load is decreased or the hot water feeding is stopped in the hot water reservoir 90 and the temperature of the engine cooling water increases, for example to not less than 95° C. at the inlet side of the water jacket 5, the operation of the waste heat recovery is stopped. That is, the water flow to the second circuit 3 is blocked and the water flow to the first circuit 40 is allowed by the changeover of the circuit changeover valve 41 to the radiation side. Thereupon, the engine cooling water from the water jacket 5 is returned to the water jacket 5 through the circuit changeover valve 41, the hot water pipe 28, the radiator 6a, the cool water pipe 30 and the water pump 104 so that solely the engine body 106 can be cooled.

As shown in FIGS. 3 and 4, since the water pump 104 and the electrically driven type circulation pump 91 etc. are arranged in the space between the engine body 106 and the radiator 6a in addition to the arrangement of the first and the second heat exchanger 2, 4 and the piping components for forming the first and the second circuits 40, 3, the whole of the engine generator 100 can be constructed compactly. Therefore, the piping lengthes of the first and the second circuits 40, 3 can be shortened. Since the piping length of the second circuit 3 is comparatively short in that way, the radiation area of the arranged pipes can be reduced so as to lessen the heat loss. Since the piping length of the first circuit 40 is also comparatively short, the resistance of water passage can be reduced and the cooling water can be circulated smoothly in the engine cooling system.

Further, since the radiator fan 6b is of a forced draft type in which cooling air is adapted to be forcibly discharged to the radiator 6a located at the left side thereof, the pipes and the like arranged in the space at the right side of the radiator fan 6b do not act as an air flow impedence to the radiator fan 6b, which enhance the cooling efficiency.

Incidentally, as shown by an alternate long and two short dashes line as a phantom line in FIG. 1, the upper reaches of the second circuit 3 relative to the first heat exchanger 2 and the lower reaches thereof relative to the water pump 104 may be connected by an auxiliary flow line 43 and a bypass control valve 46 comprising a throttling valve or a stop valve may be provided in this auxiliary flow line 43. In this case, even though the water flow to the second circuit 3 is blocked by the circuit changeover valve 41, the first heat exchanger 2 can be cooled sufficiently by the delivery of the engine cooling water from the bypass control valve 46 thereto 2.

FIGS. 5 through 9 respectively show variant embodiments corresponding to FIG. 1. Arrangements different from the above-mentioned embodiment will now be explained. The component parts having the same functions as the ones in the above-mentioned embodiment are designated by the same symbols in these variant embodiments.

First Variant Embodiment

FIG. 5 shows the first variant embodiment. It is essentially the same as the above-mentioned embodiment, this embodiment is of the type connecting the second heat exchanger 4 for the heat recovery and the heat radiation means 6 for the engine cooling in parallel with respect to the water jacket 5 of the internal combustion engine 101. However the engine cooling water is adapted to be always separated into the first and the second circuits 40, 3 respectively from the water jacket 5 differently from the above-mentioned embodiment.

The circuit changeover valve is omitted at the branching point 31 of the waste heat recovery system 102. A temperature sensor 35 is provided in the interior of the water jacket 5 so that a fan motor 38 of the radiator fan 6b can be started and stopped by the temperature sensor 35 through a start and stop control device 36 for the fan. The heat radiation control means 7 comprises a fan drive control means composed of the temperature sensor 35, the start and stop control device 36 for the fan and the fan motor 38.

In this case, the engine cooling water which recovers the heat of the engine body 106 and then flows out of the outlet nozzle 27 of the water jacket 5 is adapted to separate at the branching point 31 into the second circuit 3 for the waste heat recovery from the engine and into the first circuit 40 for the engine cooling.

The engine cooling water which has flowed into the second circuit 3 is adapted to be returned to the water jacket 5 from the first heat exchanger 2 for the heat absorption from the exhaust gas through the second heat exchanger 4 for the heat recovery, the branching point 32 and the water pump 104 so as to effectively recover the heat generated from the engine body 106 in the water jacket 5 and the exhaust gas heat in the first heat exchanger 2 respectively and to perform the heat exchanger with the fresh water 89 for the heat recovery in the second heat exchanger 4.

On the other hand, the engine cooling water which has flown into the first circuit 40 is adapted to flow into the radiator 6a from the hot water pipe 28 so as to perform the heat radiation therein and then be returned to the inlet nozzle 29 of the water jacket 5 from the cool water pipe 30 via the water pump 104.

In the case in which mainly the heat recovery is performed, when the temperature sensor 35 detects the temperature of the engine cooling water, for example of less than 95° C., the sensor 35 keeps the fan motor 38 in a stopped state, restrains the heat radiation in the radiator 6a and enhances the heat recovery efficiency in the second heat exchanger 4. To the contrary, when the temperature of the engine cooling water is increased to not less than 95° C., the fan motor 38 is driven controllably through the start and stop control device 36 for the fan according to the detection signal by the sensor 35 so that the heat radiation in the radiator 6a can be facilitated and the overheat of the internal combustion engine 101 can be prevented.

Second Variant Embodiment

FIG. 6 shows the second variant embodiment. In this embodiment, both of the second heat exchanger 4 for the heat recovery and the heat radiation means 6 for the engine cooling are connected in parallel relative to the water jacket 5 of the internal combustion engine 101, and either of them is adapted to be selected.

An inlet portion 40a of the first circuit 40 for the engine cooling is branched out from the second circuit 3 between the first heat exchanger 2 for the heat absorption from the exhaust gas and the second heat exchanger 4, and the circuit changeover valve 50 (the heat radiation control means 7) is provided at the branching point. In the case that the waste heat recovery is performed, the circuit changeover valve 50 is changed over to the position wherein the water flow to the second circuit 3 is allowed and is changed over to the position wherein the water flow to the first circuit 40 is allowed when the engine body 106 gets a little overheated. In this case, the engine cooling water always flows to the first heat exchanger 2 differently from the above-mentioned first variant embodiment (refer to FIG. 5).

Incidentally, the fan motor 38 may be electrically arranged so as to be driven only when the circuit changeover valve 50 is changed over to the position wherein the water flow to the first circuit 40 is allowed.

Third Variant Embodiment

Figure 7:
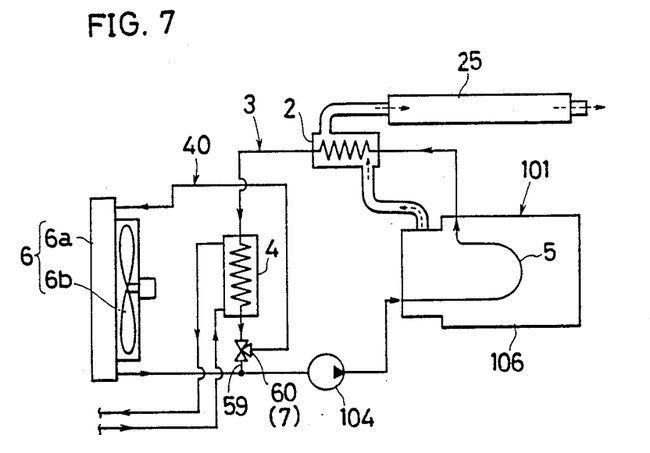

FIG. 7 shows the third variant embodiment. The difference from the above-mentioned first and second variant embodiments resides in that the second heat exchanger 4 for the heat recovery and the heat radiation means 6 for the engine cooling are connected in series relative to the water jacket 5 of the internal combustion engine 101.

In the second circuit 3 for the waste heat recovery from the engine, the inlet portion of the radiator 6a and the outlet side thereof is connected shortly by a bypass line 59, and the engine cooling water is adapted to be circulated by the changeover of a bypass valve 60 (the heat radiation control means 7) to one of the radiator 6a and the bypass line 59. When the waste heat recovery is performed, the radiator 6a is bypassed by the changeover of the bypass valve 60 to the position wherein the water flow to the second circuit 3 is allowed. Accordingly, the engine cooling water is adapted to be returned to the water jacket 5 from the first heat exchanger 2 for the heat absorption from the exhaust gas through the second heat exchanger 4 and the water pump 104 so that the heat exchanger can be carried out in the second heat exchanger 4 in order to transfer both the heat generated in the engine body 106 and the exhaust gas heat to the fresh water for the heat recovery.

On the other hand, when the internal combustion engine 101 becomes a little overheated, the bypass valve 60 is adapted to be changed over to the position wherein the water flow to the first circuit 40 is allowed so that the engine cooling water cooled in the second heat exchanger 4 can flow through the heat radiation means 6 for the engine cooling to be further cooled and then return to the water jacket 5.

Fourth Variant Embodiment

FIG. 8 shows the fourth variant embodiment. In this embodiment, the second heat exchanger 4 for the heat recovery and the heat radiation means 6 for the engine cooling are connected in series with respect to the water jacket 5 of the internal combustion engine 101 the same as the above-mentioned third variant embodiment (refer to FIG. 7). But in an arrangement different from the third variant embodiment, the second heat exchanger 4 is arranged so as to be bypassed when the heat radiation means 6 gets in service.

An outlet pipe 3b of the second heat exchanger 4 and an inlet pipe 3a thereof 4 are connected shortly by a bypass line 69, and the engine cooling liquid is adapted to be circulated by the changeover of a bypass valve 70 (the heat radiation control means 7) to one of the second heat exchanger 4 and the bypass line 69. When the waste heat recovery is performed, the circuit changeover valve 70 is adapted to be changed over to the position wherein the water flow to the inlet pipe 3a of the second heat exchanger 4 is allowed so that the engine cooling water can flow through the water jacket 5, the first heat exchanger 2 for the heat absorption from the exhaust gas, the inlet pipe 3a, the second heat exchanger 4, the outlet pipe 3b, the heat radiation means 6 and the water pump 104.

In the case that the waste heat recovery is not performed, the circuit changeover valve 70 is changed over to the position wherein the water flow to the outlet pipe 3b is allowed so that the engine cooling water can flow through the water jacket 5, the first heat exchanger 2, the branching point 71, the heat radiation means 6 and the water pump 104 in order to cool the internal combustion engine 101.

Fifth Variant Embodiment

Figure 9:
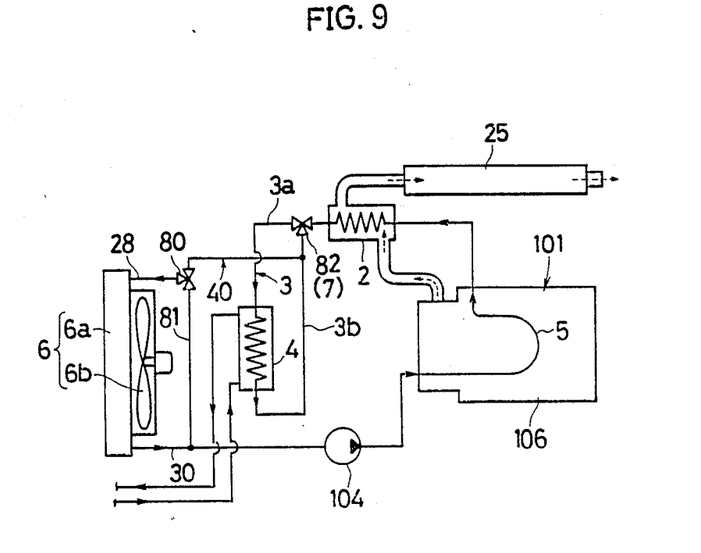

FIG. 9 shows the fifth variant embodiment. In this embodiment, the second heat exchanger 4 for the heat recovery and the heat radiation means 6 for the engine cooling can be connected in parallel or in series selectively relative to the water jacket 5 of the internal combustion engine 101. In an arrangement different from the above-mentioned fourth variant embodiment (refer to FIG. 8), a bypass line 81 is added to the second heat exchanger 4 and the heat radiation means 6.

That is, the bypass line 81 is branched out from the hot water pipe 28 of the first circuit 40, the bypass valve 80 is provided at the branching point, and the end of the bypass line 81 at the lower reaches side is connected to the cool water pipe 30. The path of the waste heat recovery can be selected from the following items (a), (b) and (c) by the changeover operation of the bypass valve 80, 82 (the heat radiation control means 7).

(a) When the waste heat recovery is not performed, the bypass valve 82 is changed over to the position wherein the water flow to the outlet pipe 3b is allowed as well as the other bypass valve 80 is changed over to the position wherein the water flow to the hot water pipe 28 is allowed. Thereupon, the engine cooling water flows through the water jacket 5, the first heat exchanger 2 for the heat absorption from the exhaust gas, the heat radiation means 6 for the engine cooling and the water pump 104 so as to bypass the second heat exchanger 4 for the heat recovery.

(b) When the waste heat recovery is fully performed, the bypass valve 82 is changed over to the position wherein the water flow to the inlet pipe 3a of the second heat exchanger 4 for the heat recovery is allowed as well as the other bypass valve 80 is changed over to the position wherein the water flow to the bypass line 81 is allowed. Thereupon the engine cooling water flows through the water jacket 5, the first heat exchanger 2 for the heat absorption from the exhaust gas, the second heat exchanger 4, the bypass line 81 and the water pump 104 so as to bypass the heat radiation means 6 for the engine cooling.

(c) In the case that it is necessary to cool the engine 101 sufficiently whilst the waste heat recovery is performed, the bypass valve 82 is changed over to the position wherein the water flow to the inlet pipe 3a of the second heat exchanger 4 for the heat recovery as well as the other bypass valve 80 is changed over to the position wherein the water flow to the hot water pipe 28 is allowed. Thereupon the engine cooling water flows through the water jacket 5, the first heat exchanger 2 for the heat absorption from the exhaust gas, the second heat exchanger 4, the heat radiation means 6 for the engine cooling and the water pump 104.

Incidentally, as the internal combustion engine 101 according to the present invention, a gasoline engine or a gas engine may be employed instead of a Diesel engine. Also, instead of the horizontal engine, a vertical engine or a vertical shaft type engine having a crankshaft arranged in a vertical manner may be employed.

The heat radiation control means 7 of the flow channel changeover type comprising the circuit changeover valve or the bypass valve may be of the type capable of always separating the engine cooling water into both circuits 3, 40, and may be a thermostat type or an electrically driven type automatic changeover valve instead of the manually operated changeover valve. Further, instead of the three-way type, the heat radiation control means 7 may be composed of two sets of two-way valves.

Further, the heat radiation means 6 for the engine cooling may be merely the assembly of the radiator and the radiator fan. The heat radiation means 6 may be a condenser or a hopper instead of the radiator. As for engine cooling liquid, the engine cooling water may be replaced with any other cooling suitable liquid such as cooling oil and the like.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

We claim:

1. A waste heat recovery system for a liquid-cooled internal combustion engine, comprising:
a first circuit for circulating a first flow of an engine cooling liquid, comprising an engine cooling radiator connected to a water jacket of said engine in the manner of a circulation loop;
a second circuit for circulating a second flow of said engine cooling liquid for recovery of waste heat from the engine, comprising a first heat exchanger for heat absorption from a flow of exhaust gas from said engine and a second heat exchanger for heat recovery with said heat exchangers connected to said water jacket in series;
said first circuit being constructed so that said first flow of the engine cooling liquid is circulated at least through said water jacket and said radiator to absorb a first portion of heat transferred from the body of the engine to cooling liquid flow through the water jacket and to then radiate said absorbed heat therefrom in the radiator, said engine cooling radiator being so arranged that heat radiation therefrom is controlled by a means for controlling heat radiation, and
said second circuit being constructed so that said second flow of the engine cooling liquid is circulated in order through the water jacket, the first heat exchanger, the second heat exchanger and the water jacket to absorb a second portion of said heat transferred from the engine body in the water jacket, to also absorb heat from exhaust gas in said first heat exchanger and to then radiate said absorbed heat in said second heat exchanger, wherein the heat radiation control means comprises a variable flow dividing valve adapted to adjustably divide the total flow of the engine cooling liquid into two portions, respectively directed to said second heat exchanger and to said engine cooling radiator.

2. A waste heat recovery system for a liquid-cooled internal combustion engine according to claim 1, wherein:
said first circuit for the engine cooling is connected in parallel with said second circuit for recovery of waste heat from the engine.

3. A waste heat recovery system for a liquid-cooled internal combustion engine according to claim 2, wherein:
an inlet portion of said first circuit is connected intermediate said water jacket and said first heat exchanger and an outlet of said first circuit is connected intermediate said second heat exchanger and said water jacket.

4. A waste heat recovery system for a liquid-cooled internal combustion engine according to claim 1, wherein:
said water pump is interposed between said second heat exchanger and said water jacket.

5. A waste heat recovery system for a liquid-cooled internal combustion engine, comprising:
a first circuit for circulating a first flow of an engine cooling liquid, comprising an engine cooling radiator connected to a water jacket of said engine in the manner of a circulation loop;
a second circuit for circulating a second flow of said engine cooling liquid for recovery of waste heat from the engine, comprising a first heat exchanger for heat absorption from a flow of exhaust gas from said engine and a second heat exchanger for heat recovery with said heat exchangers connected to said water jacket in series;
said first circuit being constructed so that said first flow of the engine cooling liquid is circulated at least through said water jacket and said radiator to absorb a first portion of heat transferred from the body of the engine to cooling liquid flow-through the water jacket and to then radiate said absorbed heat therefrom in the radiator, said engine cooling radiator being so arranged that heat radiation therefrom is controlled by a means for controlling heat radiation, and said second circuit being constructed so that said second flow of the engine cooling liquid is circulated in order through the water jacket, the first heat exchanger, the second heat exchanger and the water jacket to absorb a second portion of said heat transferred from the engine body in the water jacket, to also absorb heat from exhaust gas in said first heat exchanger and to then radiate said absorbed heat in said second heat exchanger, further comprising a radiator fan cooperating with said engine cooling radiator for engine cooling said engine cooling radiator fan being located beyond a space provided at a lateral side of the engine for accommodating heat recovery component devices, said first heat exchanger and said second heat exchanger also being located within said space, such that air from within said space is discharged through said engine cooling radiator by said radiator fan.

* * * * *